United States Patent [19]

Turner

[11] Patent Number: 4,844,581

[45] Date of Patent: Jul. 4, 1989

[54] OPTICAL TRANSMISSION PACKAGE

[75] Inventor: Andrew S. Turner, Devon, Great Britain

[73] Assignee: STC PLC, London, England

[21] Appl. No.: 41,218

[22] Filed: Apr. 22, 1987

[30] Foreign Application Priority Data

Apr. 23, 1985 [GB] United Kingdom ............... 8609858

[51] Int. Cl.$^4$ ............................................... G02B 6/36
[52] U.S. Cl. ............................ 350/96.20; 350/96.15; 350/96.17
[58] Field of Search ............... 350/96.15, 96.17, 96.20; 250/227, 552; 357/17, 19, 30, 74, 80

[56] References Cited

U.S. PATENT DOCUMENTS

| | | | |
|---|---|---|---|
| 4,296,998 | 10/1981 | Dufft | 350/96.20 |
| 4,585,304 | 4/1986 | Winter et al. | 350/96.23 X |
| 4,689,659 | 8/1987 | Watanabe | 357/81 |

FOREIGN PATENT DOCUMENTS

| | | |
|---|---|---|
| 1151277 | 8/1983 | Canada . |
| 2582413 | 11/1986 | France . |
| 2584827 | 1/1987 | France . |
| 1596103 | 8/1981 | United Kingdom . |
| 2124402 | 2/1984 | United Kingdom . |
| 2131971 | 6/1984 | United Kingdom ............. 350/96.20 |

Primary Examiner—William L. Sikes
Assistant Examiner—Phan T. Heartney
Attorney, Agent, or Firm—Lee & Smith

[57] ABSTRACT

An injection laser package having a housing and an optical fiber pigtail extending onto a sub-mount of a mount with the sub-mount being formed of a plurality of thick film layers which incorporate a resistance heating element and etched conductors which are insulated from a narrow solder pad. With the end portion of the fiber in alignment with the injection laser chip, a current is applied to the conductors to heat the sub-mount and melt the solder pad to thereby hold the fiber exactly in alignment with the chip. The portion of the fiber extending between the sub-mount and the inner end of the entrance support tube remains unsupported and thereby flexible so that external stresses on the package housing and, particularly, a support tube do not transfer any strain to the end portion of the fiber so that alignment with the injection laser chip is maintained.

5 Claims, 3 Drawing Sheets

OPTICAL TRANSMISSION PACKAGE

This invention relates to the manufacture of an optical transmission package, and in particular although not exclusively to the manufacture of hermetically sealed injection laser packages with single mode optical fibre tails, especially, but not exclusively, for use in telecommunications systems and data links.

Our published British Patent Application No. 2124402A discloses an injection laser package which is hermetically sealed and comprises a sub-assembly of a monitoring photodiode on a metal support member which is welded to a heat sink on which a laser is mounted. The heat sink is secured inside the package housing and a further sub-assembly, comprising a plastics packaged optical fibre hermetically sealed in a fibre support tube, is introduced through an aperture in one wall of the housing. An anchorage arrangement is laser beam welded to this tube and to the heat sink to secure the inner end in position for optimum optical coupling between the laser and the fibre.

This construction has proved to be reliable although somewhat delicate but a particular drawback is that it is expensive to manufacture. It requires a number of sub-assemblies all requiring great accuracy of manufacture and a relatively complex assembly arrangement to complete the final package.

Furthermore we have found that the fibre support tube which carries the optical fibre up to a point very close to the laser, can be subjected to stress through temperature changes of the package and external forces on the package. Although a discrete thermistor can be employed within the package to monitor the temperature, and a heat pump mounted between the sub-assemblies supporting the tube and the laser package can attempt to maintain the sub-assemblies within a pre-set temperature range to minimise the thermal stress, nevertheless the hermetic tube tends to transmit heat along it from the outer package casing directing to the sub-assembly and very close to the interface between the fibre end and the laser, causing local heating or local cooling if the hermetic outer casing of the package suffers extremes of temperature. That is to say that the thermistor mounted on one of the sub-assemblies may not in fact be sensing the actual local temperature in the vincinity of these critical regions.

It is an object of the present invention to simplify the construction of an optical transmission package and at the same time provide an improved performance over that achieved by devices available on the market today.

According to the present invention there is provided an optical transmission package comprising a housing having an entrance for an optical fibre, a sub-mount within the housing, an optical fibre extending through the entrance and onto the sub-mount, and a semiconductor optical transmission device in direct light-transfer-connection with the end of the fibre, the sub-mount comprising a plurality of films formed one on top of the other and the fibre being secured to the sub-mount by an adhesive.

According to a further aspect of the present invention there is provided a multi-layer thick film construction, one of said layers within said construction being a resistive layer which can be used as a heating element, there being connection terminals connected with said element whereby an electric current can be passed through the element to heat the mounting arrangement.

In order that the invention can be clearly understood reference will now be made to the accompanying drawings, in which.

Figure 1:
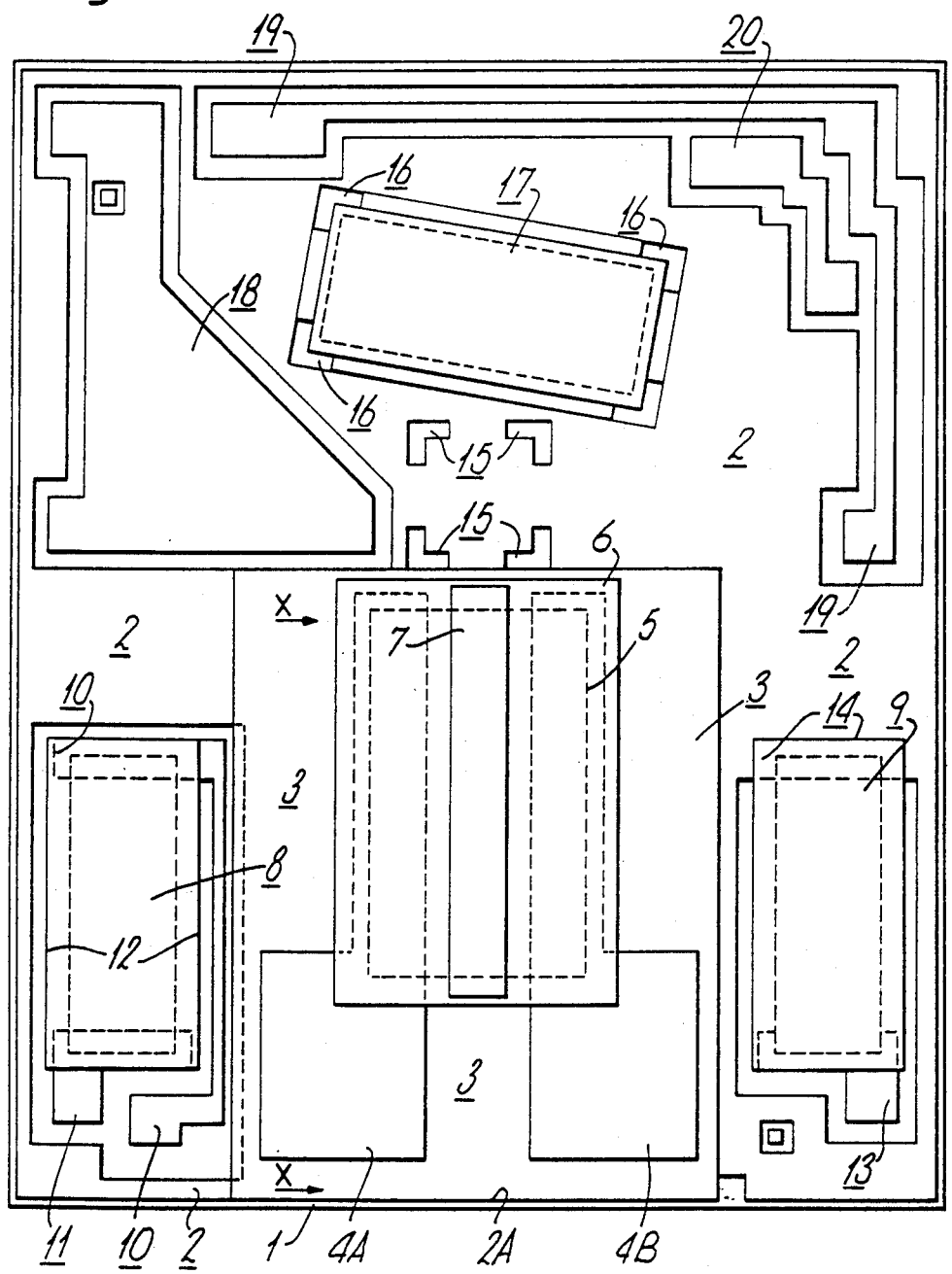
FIG. 1 shows a plan view of a mount for a single mode injection laser package according to an embodiment of the invention.

Referring to FIG. 1, a large ceramic piece (e.g. 5 cm×5 cm or 10 cm×10 cm) which will form several substrates such as 1 is screen printed with thick film gold pads to form ground planes on the back and then the front is screen printed with several thick film gold "patterns" and as shown in FIG. 1 and each comprising a connection pattern of conductors and a ground plane 2. This is done using standard thick film gold printing at 8-12 um fired thickness. This printing also "plates through" two via holes to connect to ground planes 2 with the bottom ground planes.

The channels between the several patterns are used for laser scribing. After the final prints and separation the two longer edges are printed with gold ink to further connect the upper ground plane 2 with the lower ground plane. This is for better operation at very high bit rate working.

One portion 2A of the ground plane 2 forms the base for a sub-mount formed solely of thick film inks and dielectric which are fired to provide a platform at the correct level on which is mounted the end portion of the fibre tail.

Figure 2:
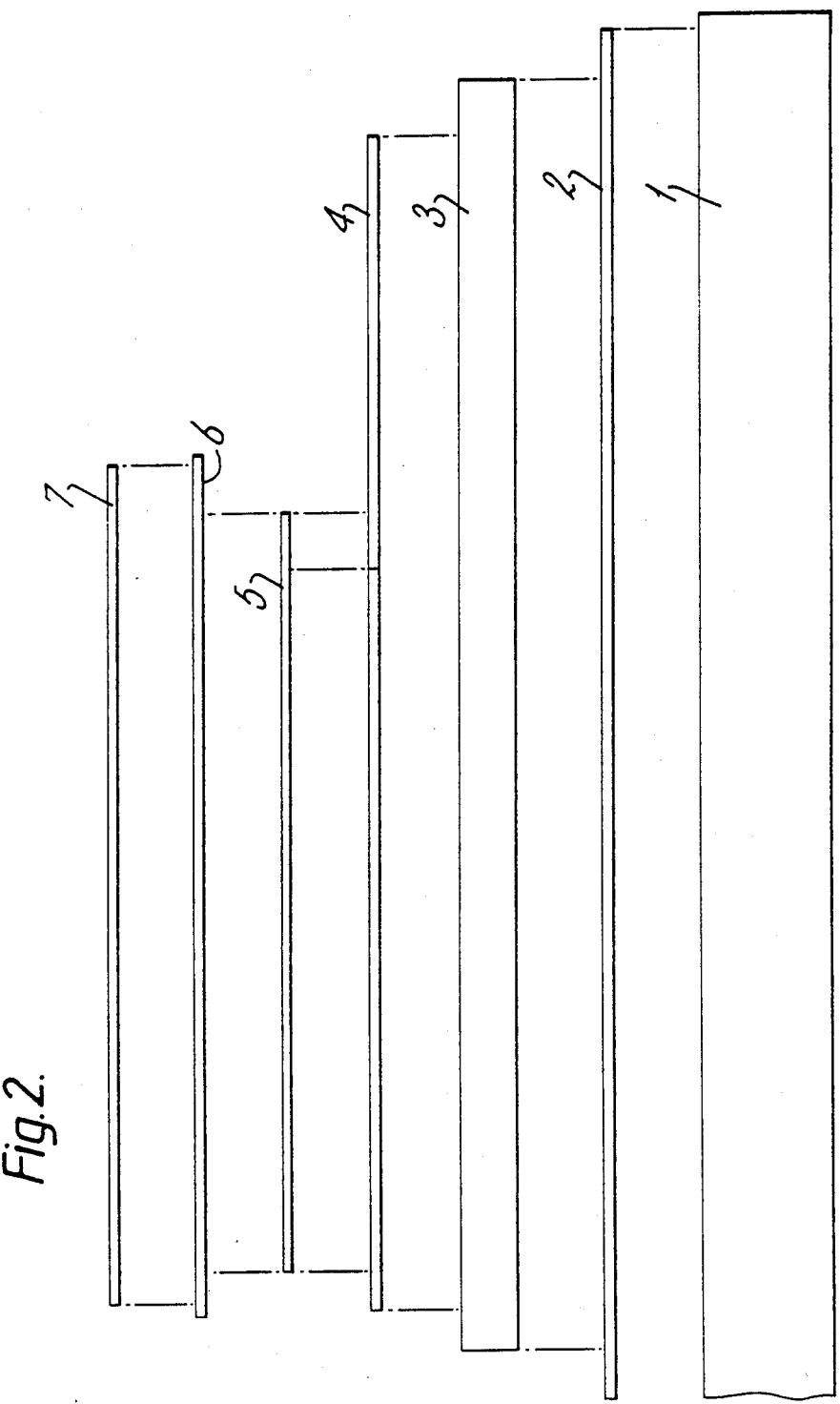
FIG. 2 shows somewhat diagrammatically the sequence in which the layers for forming a sub-mount of the mount of FIG. 1, are applied and as viewed edgewise of the mount of FIG. 1 in the direction of the arrows X—X.

The first layer of this sub-mount, which with reference to FIG. 2 can be more clearly understood, comprises a dielectric layer 3 to provide an electrically insulating layer. The dielectric comprises for example glass and alumina and is fired at a temperature of approximately 850° C.

On to the dielectric is deposited a pair of conductors 4A and 4B of a thick film gold ink. The dielectric 3 forms an insulating layer for insulating the conductors 4A and 4B from each other and from the ground plane.

Across conductors 4A, 4B is deposited then a resistive thick film ink, for example a ruthenium compound, this resistive layer 5 not extending beyond the left hand and right hand edges respectively of conductors 4A and 4B, or beyond the tops of those conductors as viewed in FIG. 1.

On top of the resistive layer 5 and the outer edge regins of the conductors 4A and 4B is a second dielectric layer 6, similar to the layer 3.

On top of the dielectric 6, is, finally, provided a solder pad 7 of a platinum gold ink compound. The width of this pad is small and only a few times wider than the diameter of the fibre which is to be soldered. The fibre diameter is 130 um and the width of the track is approximately 500 um.

These layers therefore produce a sub-mount for the fibre end termination of the correct height for aligning it with an electro-optical transducer, in this particular embodiment a semiconductor laser chip, to be described later.

In addition to the sub-mount for the fibre there is also screen-printed a pair of thermistor elements 8 and 9, thermistor element 8 being printed onto top and bottom printed conductors 10 and 11 with an overglaze 12 and similarly thermistor element 9 is printed at its upper end as viewed in FIG. 1 onto a portion of ground plane 2 and at its lower end onto etched conductor 13. An overglaze 14 is provided to protect the thermistor element.

Depending on the particular type of package to be provided e.g. for a monomode 1.3 mm injection laser package, one or other of the thermistor elements is connected via external circuitry to control a heat pump in the package for maintaining the mount, particularly the laser chip, within a close band of temperatures. Where temperature control is not necessary, then the heat pump will be omitted and the thermistor elements will not be connected in circuit.

In the embodiment being described an injection laser package is intended, and the visual location markers 15 indicate approximately the position to be occupied by the injection laser header on which is mounted the injection laser chip.

Similarly the visible location markers 16 indicate the approximate location of a monitor block containing a monitoring photodiode which will receive the backlight from the injection laser and, via external control circuitry, is used to monitor the laser performance and control the bias current applied to the laser so that, when the output power of the laser falls with age, the bias current can be changed to increase the laser output and thereby maintain a substantially constant output throughout the working life of the laser. The monitor block is indicated by the reference numeral 17.

Figure 3:
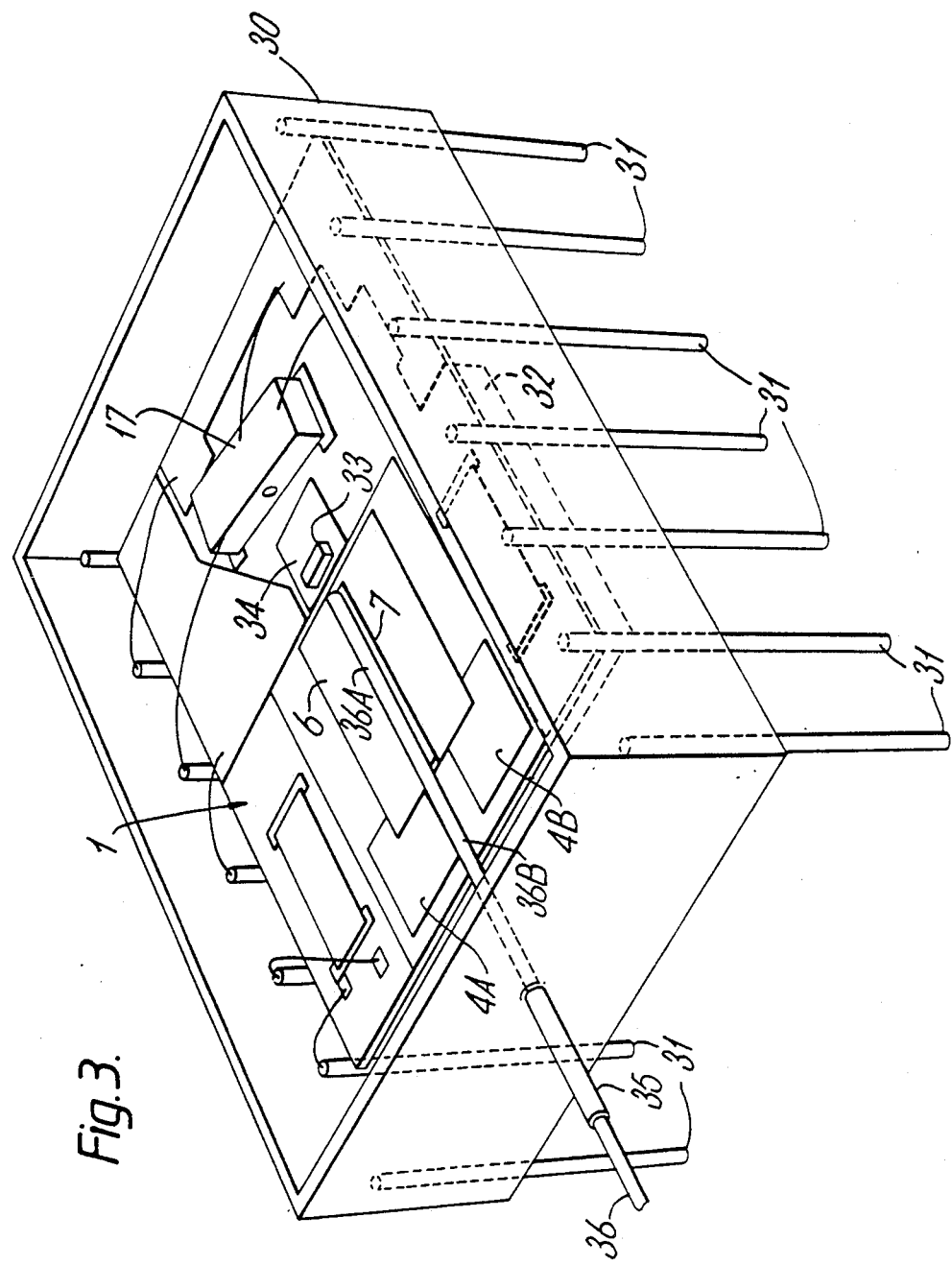
FIG. 3 shows in perspective and somewhat diagrammatically the laser injection package incorporating the mount of FIGS. 1 and 2.

The printed conductor patterns 18, 19 and 20 are connected via wire bonding to the laser chip and the monitor block for onward connection to the upper ends of the DIL external connection terminals 31 shown more clearly in FIG. 3.

Referring to FIG. 3 (which is not drawn to scale) there is shown an injection laser package with the lid removed for clarity. The package comprises a box-like housing 30 having 14 connection terminals such as 31 extending through the base (not shown) to the interior of the housing 30.

The ceramic mount, indicated in FIG. 3 generally by the reference numeral 1, is supported inside the housing 30 on a heat pump 32 which is secured on the base of the box, on the one hand, and to the underside of the mount 1 on the other hand. In some applications the heat pump 32 would be replaced by a simple metal block where close temperature control of the electro-optical transducer i.e. laser ELED or other optical transmitting-/receiving device, is not necessary.

The monitor 17 is located as shown to monitor the rear output of the laser 33 mounted on its header 34 on the mount 1. In some applications the monitor 17 would not be required.

Secured to the housing 30 is an extrance support tube 35 welded to the housing 30 and providing a rigid support for an optical fibre tail 36 which optically connects the electro-optic transducer with the outside world.

An end portion 36A lies on the solder pad 7 and the portion of the fibre which extends through the tube 35 is secured in the tube, for example by solder or epoxy resin adhesive.

In assembling the package, the optical fibre end portion 36A is aligned with the laser chip 33, in the particular embodiment described an injection laser. When the alignment is correct, by monitoring the optical transmission via the optical fibre tail 36, an electrical source is applied to the conductors 4A and 4B which heats up the resistor layer 5 in the optical fibre sub-mount. This heating is sufficient to melt the solder pad and thereby solder the fibre to its sub-mount directly in alignment with the injection laser. The height of the top of the solder pad will be fixed by manufacture and will have a tolerance. The height of the emitting area of the laser above the sub-mount will be fixed by the pedestal, solder fillet thickness etc and will have a tolerance. In assembling the package we support the fibre in space above the solder pad either by a vacuum and/or mechanical grippers to locate the optimum position. When the solder infill freezes it pulls the fibre down so prior to solder infill we:

1. locate optimum position;
2. step up a known amount away from the optimum position;
3. allow the solder freeze to pull down the fibre by this known amount to restore the optimum position so that the fibre is brought directly into alignment with the optical transmission region of the semiconductor device, in this embodiment the laser chip.

A portion of the optical fibre tail 36B which extends between the soldered end portion 36A and the inner end of the support tube 35, remains flexible and is not constrained by any rigid structure secured either to the mount 1 or to the housing 30. This ensures that any movement of the tube 35 under adverse conditions will not be transferred to the end termination of the optical fibre 36A which will therefore be unaffected by external physical forces on the housing and the tube and it also provides a thermal barrier between the vicinity of the chip and the outer housing 30, important particularly where a heat pump is used to control the chip temperature stable over a small range of temperatures e.g. 25° C.± 1° C.

It has been found that the film circuit techniques adopted for the mount 1 provide a significant simplification to the construction of an injection laser package and at the same time provide precise geometric control particularly for the alignment of the fibre with the injection laser chip.

Although the embodiment described is for single mode fibres there is no reason why it should not be used for multi-mode fibres.

It is to be understood that although the specific embodiment describes a laser in the optical transmission package, it could equally well be a photo detector. Thus the transmission package could function either as a transmitter or a receiver.

Furthermore it is to be understood that the multi-layer thick film mounting arrangement described has other applications beyond that of the transmission package described. For example the buried resistive layer could be used for local temperature control in e.g. test equipment or circuits or parts of circuits for use in sub-zero environments.

I claim:

1. An optical transmission package comprising a housing having an entrance for an optical fibre, a sub-mount within the housing, an optical fibre extending through the entrance and onto the sub-mount, and a semiconductor optical transmission device in direct light-transfer-connection with the end of the fibre, the sub-mount comprising a plurality of thick films formed one on top of the other by deposition and firing of thick film inks, one of said films of the sub-mount being formed as an electrical resistance heating element, the fibre being secured to the uppermost film of the sub-mount by an adhesive.

2. A package as claimed in claim 1, wherein the adhesive comprises a low-melting-point solder.

3. A package as claimed in claim 1 wherein the optical fibre traverses a gap between the entrance and a nearer edge of the sub-mount, and remains physically unsupported over that gap.

4. A package as claimed in claim 1 wherein the sub-mount is formed on a rigid insulating base, and at least one thermistor element is formed on the base by a thick film screening process said element being arranged to sense the temperature of the substrate and for providing temperature compensation thereto.

5. A mounting arrangement comprising a substrate, a sub-mount formed of a multi-layer thick film construction on said substrate, one of said layers within said construction being a resistive layer which can be used as a heating element, and connection terminals an said substrate connected with said element whereby an electric current can be passed through the element to heat the mounting arrangement, each layer of said multi-layer construction comprising a deposited and fired thick film ink.

* * * * *